(No Model.)
W. M. BUCHNAN.
TWO WHEELED VEHICLE.
No. 311,290. Patented Jan. 27, 1885.
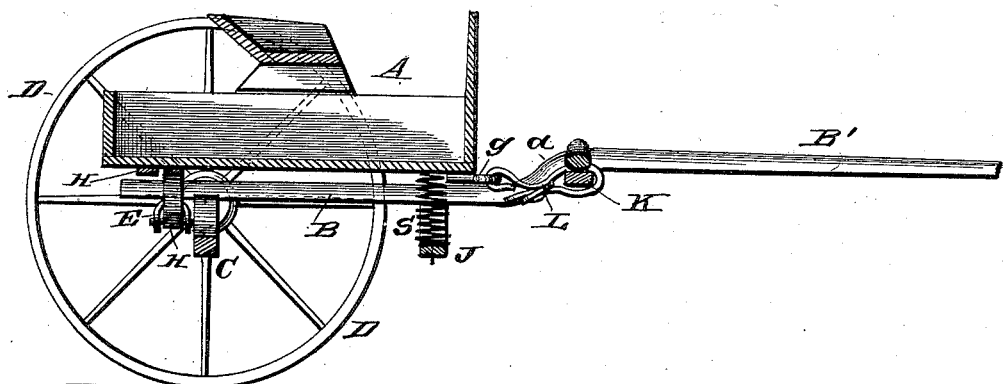
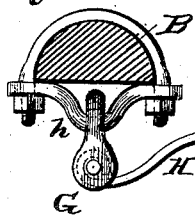
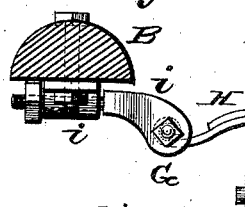
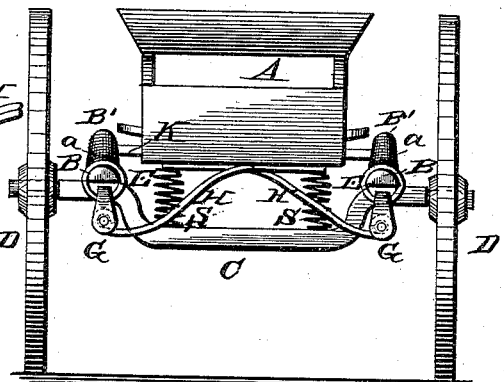
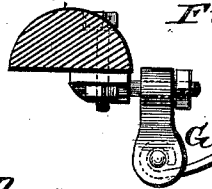
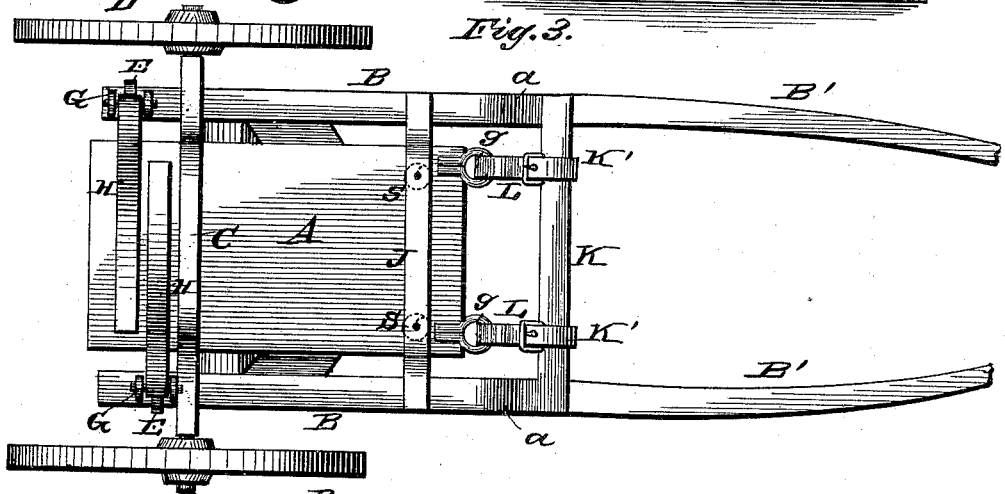
WITNESSES
Phil C. Dieterich
W. P. Keyworth
INVENTOR
William M. Buchnan
by
T. H. Alexander
Attorney

UNITED STATES PATENT OFFICE.

WILLIAM M. BUCHNAN, OF COLUMBIA, TENNESSEE.

TWO-WHEELED VEHICLE.

SPECIFICATION forming part of Letters Patent No. 311,290, dated January 27, 1885.

Application filed April 10, 1884. (No model.)

*To all whom it may concern:*

Be it known that I, W. M. BUCHNAN, of Columbia, in the county of Maury and State of Tennessee, have invented certain new and useful Improvements in Two-Wheeled Vehicles; and I do hereby declare that the following is a full, clear, and exact description thereof, reference being had to the accompanying drawings, and to the letters of reference marked thereon, which form part of this specification, in which—

Figure 1 is a longitudinal section of the vehicle. Fig. 2 is a rear view of the same. Fig. 3 is a bottom view. Figs. 4, 5, and 6 are modifications of the knuckle-joints which connect the right and left rear springs to the rear extensions of the shafts.

This invention relates to what are known as "two-wheel spring-body vehicles;" and it consists in novel combinations of parts, which will be fully understood from the following description when taken in connection with the annexed drawings.

A designates the body of my vehicle, which may be constructed in any well-known manner; but I prefer to construct it in the shape of an oblong square.

B B designate two shafts, which are parallel to each other and extended to form thills B' B'. The shafts are depressed at the curves $a\ a$, which are continuous with the thills, for the purpose of lowering the body, so that it will afford facility of entrance and egress. Near the rear ends of the shafts I attach the axle C, and on this axle the wheels D D are placed. The axle C is depressed beneath the body of the vehicle, as shown in the rear view, Fig. 2.

E E are clips, which in the last figure referred to are shown in the shape of elongated rings rigidly secured to the rear extensions of the shafts, and to which are looped the spring-eyes G G of $f$-shaped springs H H, which pass each other right and left transversely across the bottom of the body A, and on which springs the rear part of the body is sustained. By thus attaching the springs (which in some degree represent the italic letter $f$) to the rear extensions of the shafts and to the body of the vehicle, I secure two advantages, to wit: I allow free lateral play of the body, which will prevent shocks or concussions in this direction, and I also use long springs, and thus prevent shocks in a vertical direction.

J designates a transverse downwardly-bowed support for the front part of the cart-body, which is rigidly secured to the parallel shafts and serves as a cross-tie therefor. It will be observed that this cross-tie J, like the axle, is depressed for the purpose of allowing the front part of the body to have free vertical play corresponding to the same play at the rear of the body. The front part of the body is sustained by helical springs S S, the lower extremities of which are suitably attached to the said cross-ties. In front of the body at the usual position is the thill-bar K, to which the single-tree is applied. Now, to prevent injury to the springs above described by sudden forward movements of the animal, I employ flexible connections L L, which may be adjustable by means of buckles for the purpose of shortening or lengthening them as occasion requires. These flexible straps are connected to the thill-bar at K', and also to the loops $g\ g$, which are rigidly connected to the floor or front part of the body of the cart.

I have also shown in the annexed drawings three modifications of the means above described for flexibly connecting the $f$-springs to the rear ends of the shafts. The first modification consists in bowing the bottom transverse part of the clip, so that it forms a short eye or loop, $h$, to which the outer extremity of each spring may be connected by a link. The second modification consists in pivotally connecting the extremity of each spring (and I will state that the rear springs may be leaf-springs) to a horizontal swivel, $i$, applied to a plate which is rigidly secured to the shafts. The third modification consists in pivoting the outer extremity of each rear spring to a pendant which is free to vibrate longitudinally on a pin formed on or secured to a plate which in practice will be rigidly secured to the shaft-extension.

In order to fully explain my invention, I have denominated the rear longitudinal parts of the thills the "shafts," and those parts which extend beyond the curves the "thills."

Having described my invention, what I claim as new, and desire to secure by Letters Patent, is—

The combination of rear-depressed shafts, a rear-depressed axle, a front-depressed crosstie, rear transverse springs, front helical springs, and forward flexible connections for the body of the vehicle, all constructed and adapted to operate substantially in the manner and for the purposes described.

In testimony that I claim the foregoing as my own I affix my signature in presence of two witnesses.

WILLIAM M. BUCHNAN.

Witnesses:
   HORACE S. COOPER,
   E. E. ERWIN.